US012734545B2

(12) United States Patent
Nagai et al.

(10) Patent No.: US 12,734,545 B2
(45) Date of Patent: Sep. 15, 2026

(54) MANUFACTURING METHOD FOR OPTICAL FIBER TAPE CORE WIRE AND MANUFACTURING APPARATUS FOR OPTICAL FIBER TAPE CORE WIRE

(71) Applicant: SWCC Corporation, Kawasaki (JP)

(72) Inventors: Takeshiro Nagai, Kawasaki (JP); Takehiko Yamamoto, Kawasaki (JP); Wataru Noro, Kawasaki (JP); Yuki Ota, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 0 days.

(21) Appl. No.: 19/107,127

(22) PCT Filed: Feb. 21, 2024

(86) PCT No.: PCT/JP2024/006233

§ 371 (c)(1),
(2) Date: Feb. 27, 2025

(87) PCT Pub. No.: WO2025/177454

PCT Pub. Date: Aug. 28, 2025

(65) Prior Publication Data

US 2026/0001096 A1 Jan. 1, 2026

(51) Int. Cl.

| | |
|---|---|
| ***B05C 11/04*** | (2006.01) |
| ***B05C 5/02*** | (2006.01) |
| ***B05C 21/00*** | (2006.01) |
| ***G02B 6/44*** | (2006.01) |

(52) U.S. Cl.

CPC ............ *B05C 11/04* (2013.01); *B05C 5/0241* (2013.01); *B05C 5/0258* (2013.01); *B05C 21/00* (2013.01); *G02B 6/448* (2013.01)

(58) Field of Classification Search

None

See application file for complete search history.

(56) References Cited

U.S. PATENT DOCUMENTS

| | | | | |
|---|---|---|---|---|
| 2019/0022962 | A1* | 1/2019 | Moriya | G02B 6/441 |
| 2019/0317289 | A1 | 10/2019 | Sekine et al. | |
| 2024/0319464 | A1* | 9/2024 | Ota | G02B 6/4404 |

FOREIGN PATENT DOCUMENTS

| | | | | |
|---|---|---|---|---|
| CN | 115236813 | A | 10/2022 | |
| JP | 2010033010 | A | 2/2010 | |
| JP | 2017032721 | A * | 2/2017 | |
| JP | 2018106098 | A | 7/2018 | |
| WO | WO-2023127828 | A1 * | 7/2023 | G02B 6/4434 |
| WO | 2023162680 | A1 | 8/2023 | |
| WO | 2024016387 | A1 | 1/2024 | |

* cited by examiner

*Primary Examiner* — Jose I Hernandez-Kenney

(74) *Attorney, Agent, or Firm* — The Roy Gross Law Firm, LLC; Roy D. Gross

(57) ABSTRACT

Provided is a manufacturing method for an optical fiber tape core wire (10) including: coating a plurality of optical fibers (20) with a resin in an uncured state; removing, by a removal part (120), the resin in the uncured state partially; and curing the remaining resin in the uncured state. The removal part (120) includes a rotary blade (121), a slit (126), positioning part (122), and a suction part (123). In the removing of the resin, the resin in the uncured state between the optical fibers (20) is extruded to the outlet opening (126*a*) while moving the optical fibers (20) from upstream to downstream, and the resin in the uncured state extruded through the outlet opening (126*a*) is suctioned by the suction part (123).

2 Claims, 5 Drawing Sheets

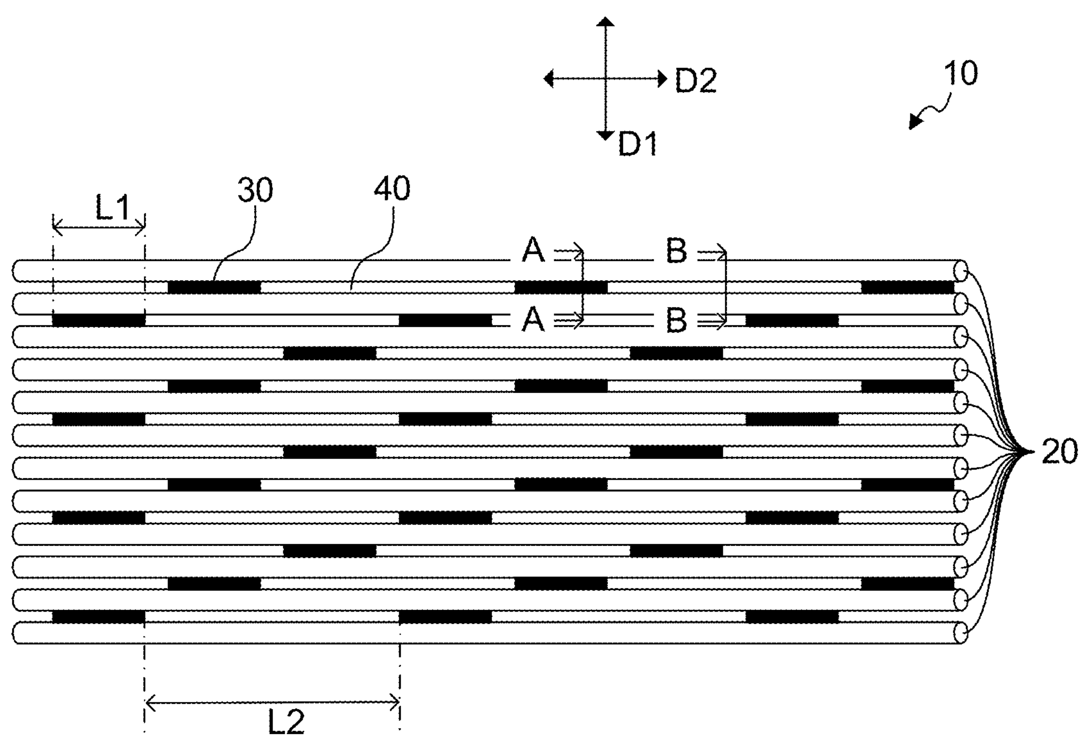
FIG. 1A
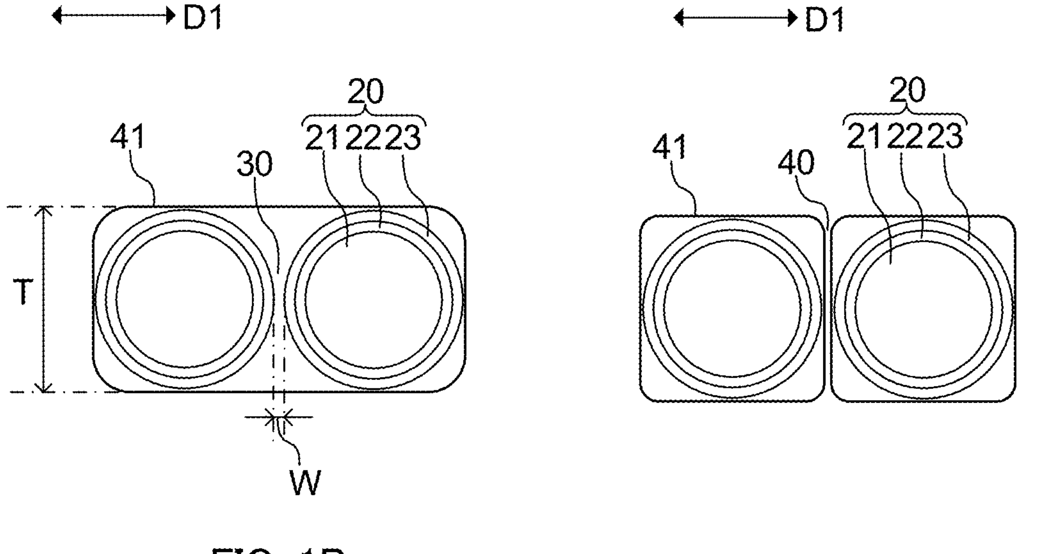
FIG. 1B
FIG. 1C

MANUFACTURING METHOD FOR OPTICAL FIBER TAPE CORE WIRE AND MANUFACTURING APPARATUS FOR OPTICAL FIBER TAPE CORE WIRE

CROSS REFERENCE TO RELATED APPLICATIONS

This application is a National Phase of PCT Patent Application No. PCT/JP2024/006233 having International filing date of Feb. 21, 2024 the contents of which are incorporated herein by reference in their entirety.

FIELD OF THE INVENTION

The present invention relates to a manufacturing method for an optical fiber tape core wire and a manufacturing apparatus for an optical fiber tape core wire.

BACKGROUND ART

In recent years, data traffic has increased dramatically due to popularization of Internet of Things (IoT), full-scale 5G commercialization, autonomous driving of automobiles, and so on, and demand has been increasing for the maintenance and construction of high-speed and high-capacity optical fiber communication networks that support such traffic. In order to economically realize the maintenance and construction of a high-speed and high-capacity optical fiber communication networks, it is important to accommodate more single-core coated optical fibers (optical fibers) in existing ducts.

When a large number of single-core coated optical fibers are accommodated in existing ducts as described above, a rollable ribbon (optical fiber tape core wire) in which single-core coated optical fibers are intermittently coupled is used from the viewpoint of workability in wiring installation work (see, for example, Patent Literature (hereinafter referred to as "PTL") 1).

PTL 1 describes a first manufacturing apparatus for an optical fiber tape core wire, which includes: a coating die for supplying an uncured UV-curable resin to parallel optical fibers and forming separated portions in which adjacent optical fibers are separated from each other and bonded portions in which adjacent optical fibers are bonded to each other; and a spot UV lamp for curing the uncured UV-curable resin. The coating die includes: a shutter groove portion that communicates with an upper surface, a front surface, and a lower surface; a shutter for forming separated portions and bonded portions by partially removing the uncured UV-curable resin by moving up and down inside the shutter groove portion, and a suction apparatus that absorbs the UV-curable resin that has adhered to the shutter. In the first manufacturing apparatus for the optical fiber tape core wire described in PTL 1, the optical fiber tape core wire is manufactured by supplying a UV-curable resin while sending out optical fibers, forming separated portions and bonded portions, and then curing the UV-curable resin.

Further, PTL 1 describes a second manufacturing apparatus for an optical fiber tape core wire, which includes: a coating die including a disc with a notch instead of a shutter; a spot UV lamp; a resin removing means including a brush for removing resin that has adhered to the disc; and a cleaning means (tank) for cleaning the brush. The brush is disposed so as to be in contact with the disc and the uncured UV-curable resin in the cleaning means, and it is configured such that when the brush rotates, the cleaning means continuously reserves the uncured UV-curable resin that has adhered to the disc. In the second manufacturing apparatus for the optical fiber tape core wire described in PTL 1, the optical fiber tape core wire is manufactured by supplying a UV-curable resin while sending out optical fibers, forming separated portions and bonded portions with a disc, and then curing the UV-curable resin.

CITATION LIST

Patent Literature

PTL 1

Japanese Patent Application Laid-Open No. 2010-033010

SUMMARY OF INVENTION

Technical Problem

However, in the first manufacturing apparatus for the optical fiber tape core wire described in PTL 1, the UV-curable resin that has been partially removed may adhere to optical fibers again, causing adjacent optical fibers to be bonded to each other.

Further, in the second manufacturing apparatus for the optical fiber tape core wire described in PTL 1, the brush is in contact with the uncured UV-curable resin in the cleaning means, and thus, the uncured UV-curable resin in the cleaning means may adhere to the disc due to the brush. As a result, even in the second manufacturing apparatus for the optical fiber tape core wire described in PTL 1, the UV-curable resin may adhere to optical fibers again, causing adjacent optical fibers to be bonded to each other.

As described above, in the first and second manufacturing apparatuses for optical fiber core wires described in PTL 1, bonded portions and separated portions may not be appropriately formed.

An object of the present invention is to provide a manufacturing method for an optical fiber tape core wire and a manufacturing apparatus for an optical fiber tape core wire each capable of forming coupling portions and separation portions appropriately.

In order to solve the above-described problem, an aspect of the present invention provides a manufacturing method for an optical fiber tape core wire including a plurality of single-core coated optical fibers, where the plurality of single-core coated optical fibers is partially coupled to each other. The method includes:

coating the plurality of single-core coated optical fibers with a resin in an uncured state, where the plurality of single-core coated optical fibers is disposed in parallel;

partially removing, by a removal part, the resin in the uncured state between, among the plurality of single-core coated optical fibers coated with the resin in the uncured state, a pair of the plurality of single-core coated optical fibers, where the pair of the plurality of single-core coated optical fibers is adjacent to each other; and curing the resin in the uncured state remaining on the plurality of single-core coated optical fibers.

The removal part includes:

a plurality of rotary blades each of which is disposed so as to be located between the pair of the plurality of single-core coated optical fibers adjacent to each other and intermittently extrudes the resin in the uncured state between the pair of the plurality of single-core coated optical fibers adjacent to each other;

a positioning part including:

a through-hole through which the plurality of single-core coated optical fibers coated with the resin in the uncured state passes;

a plurality of slits each communicating with the through-hole, where the plurality of slits is a plurality of slits inside which the plurality of rotary blades rotates, respectively; and a plurality of outlet openings of the plurality of slits, where the plurality of outlet openings is a plurality of outlet openings through which the resin extruded by the plurality of rotary blades comes out; and a suction part including a suction opening, where the suction opening is disposed so as to cover the plurality of outlet openings.

In the partially removing of the resin in the uncured state, the resin in the uncured state between the pair of the plurality of single-core coated optical fibers adjacent to each other is intermittently extruded to the plurality of outlet openings by rotating the plurality of rotary blades while moving the plurality of single-core coated optical fibers coated with the resin in the uncured state from upstream to downstream in the through-hole, and the resin in the uncured state extruded through the plurality of outlet openings is suctioned by the suction part.

Another aspect of the present invention provides a manufacturing apparatus for an optical fiber tape core wire including a plurality of single-core coated optical fibers, where the plurality of single-core coated optical fibers is partially coupled to each other. The manufacturing apparatus includes:

coating the plurality of single-core coated optical fibers with a resin in an uncured state, where the plurality of single-core coated optical fibers is disposed in parallel;

a removal part that partially removes the resin in the uncured state between, among the plurality of single-core coated optical fibers coated with the resin in the uncured state and disposed in parallel, a pair of the plurality of single-core coated optical fibers, where the pair of the plurality of single-core coated optical fibers is adjacent to each other; and a curing part that cures the resin in the uncured state remaining on the plurality of single-core coated optical fibers.

The removal part includes:

a plurality of rotary blades each of which is disposed so as to be located between the pair of the plurality of single-core coated optical fibers adjacent to each other and intermittently extrudes the resin in the uncured state between the pair of the plurality of single-core coated optical fibers adjacent to each other;

a positioning part including:

a through-hole through which the plurality of single-core coated optical fibers coated with the resin in the uncured state passes;

a plurality of slits each communicating with the through-hole, where the plurality of slits is a plurality of slits inside which the plurality of rotary blades rotates, respectively; and a plurality of outlet openings of the plurality of slits, where the plurality of outlet openings is a plurality of outlet openings through which the resin extruded by the plurality of rotary blades comes out; and a suction part including a suction opening, where the suction opening is disposed so as to cover the plurality of outlet openings.

In the removal part, the resin in the uncured state between the pair of the plurality of single-core coated optical fibers adjacent to each other is intermittently extruded to the plurality of outlet openings by rotating the plurality of rotary blades while moving the plurality of single-core coated optical fibers coated with the resin in the uncured state from upstream to downstream in the through-hole, and the resin in the uncured state extruded through the plurality of outlet openings is suctioned by the suction part.

Advantageous Effects of Invention

According to the present invention, it is possible to provide a manufacturing method for an optical fiber tape core wire and a manufacturing apparatus for an optical fiber tape core wire each capable of forming coupling portions and separation portions appropriately.

BRIEF DESCRIPTION OF DRAWINGS

FIGS. 1A to 1C are schematic diagrams illustrating an optical fiber tape core wire;

DESCRIPTION OF EMBODIMENTS

Figure 2:
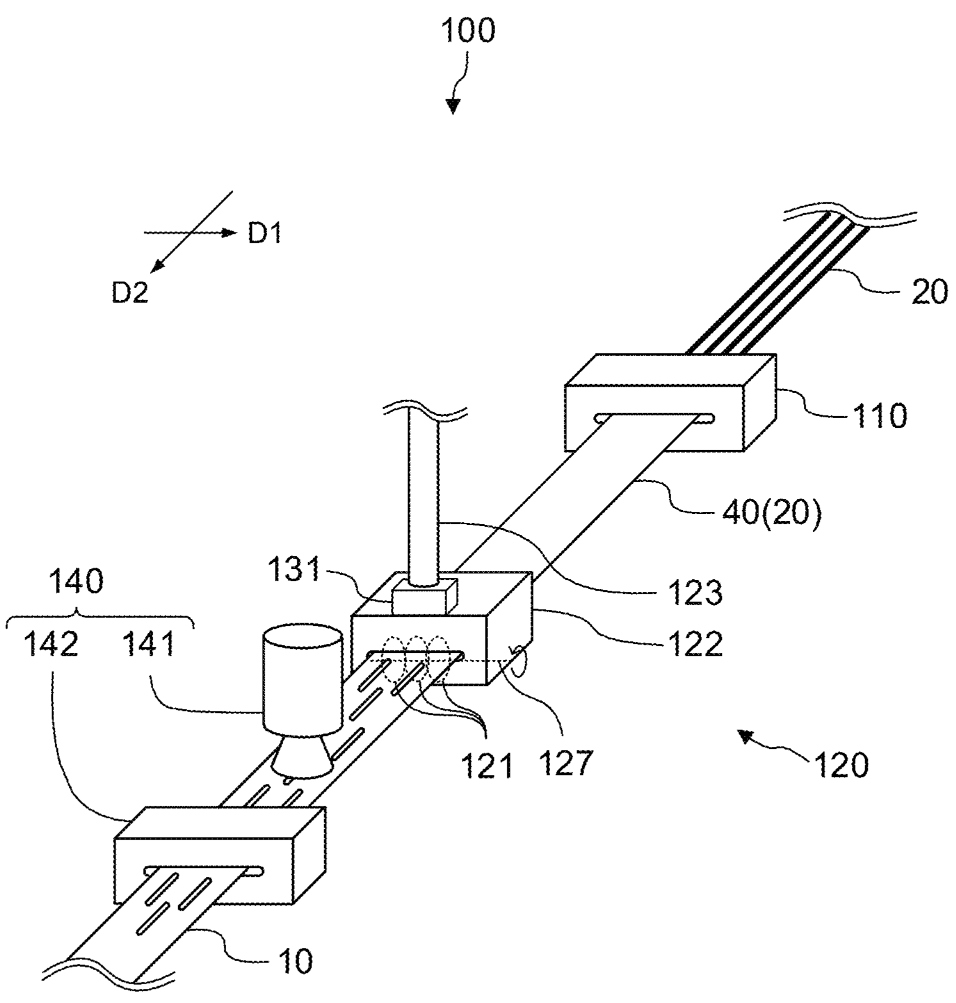
FIG. 2 is a diagram illustrating a schematic configuration of a manufacturing apparatus for an optical fiber tape core wire.

Hereinafter, a manufacturing method for an optical fiber tape core wire and a manufacturing apparatus for an optical fiber tape core wire according to a preferred embodiment of the present invention will be described. With respect to the description "to" indicating a numerical range, the lower limit value and the upper limit value are included in the numerical range in the present specification.

First, a description will be given of an optical fiber tape core wire to be manufactured, followed by a description of a manufacturing apparatus for the optical fiber tape core wire and a manufacturing method for the optical fiber tape core wire. In the following description, a direction in which optical fibers are disposed in parallel will be referred to as a first direction, the length direction of the optical fibers will be referred to as a second direction, and a direction orthogonal to the first direction and the second direction will be referred to as a third direction.

Configuration of Optical Fiber Tape Core Wire

FIG. 1A is a schematic plan view of optical fiber tape core wire 10, FIG. 1B is a cross-sectional view taken along line A-A in FIG. 1A, and FIG. 1C is a cross-sectional view taken along line B-B in FIG. 1A.

As illustrated in FIGS. 1A to 1C, optical fiber tape core wire 10 includes a plurality of single-core coated optical fibers (hereinafter, simply referred to as "optical fibers") 20, a plurality of coupling portions 30, and a plurality of separation portions 40.

The plurality of optical fibers 20 is disposed in parallel in first direction D1. The number of optical fibers 20 is not particularly limited as long as the number is two or more. The number of optical fibers 20 included in one optical fiber tape core wire 10 is appropriately selected according to the application of optical fiber tape core wire 10. For example, the number of optical fibers 20 included in one optical fiber tape core wire 10 is in a range of two to twelve. Note that, in the present embodiment, twelve optical fibers 20 are disposed in parallel in one optical fiber tape core wire 10.

As illustrated in FIGS. 1B and 1C, optical fiber 20 includes optical fiber strand 21, primary coating layer 22, and secondary coating layer 23. As optical fiber strand 21, primary coating layer 22, and secondary coating layer 23, the same as the optical fiber strand, the first coating layer, and the second coating layer of a known optical fiber can be used. A colored layer may be further formed on secondary coating layer 23 of optical fiber 20. In one optical fiber tape core wire 10, the colors of the colored layers of the plurality of optical fibers 20 are preferably different from each other. Thus, it is possible to identify the plurality of optical fibers 20 within one optical fiber tape core wire 10.

In the present embodiment, tape layer 41 is further disposed around the plurality of optical fibers 20, and optical fibers 20 adjacent to each other are intermittently coupled to each other by tape layer 41. In the present embodiment, regions in which optical fibers 20 adjacent to each other are partially coupled to each other are coupling portions 30, and regions in which optical fibers 20 adjacent to each other are partially separated from each other are separation portions 40.

Coupling portion 30 is disposed between every pair of optical fibers 20 adjacent to each other and partially couples optical fibers 20, which are adjacent to each other, to each other. Separation portion 40 is disposed between every pair of optical fibers 20 adjacent to each other and partially separates optical fibers 20, which are adjacent to each other, from each other. The disposition of coupling portions 30 and separation portions 40 is not particularly limited. In optical fiber tape core wire 10 of the present embodiment, coupling portions 30 and separation portions 40 are alternately disposed in the longitudinal direction (second direction D2) of optical fiber tape core wire 10. Further, in optical fiber tape core wire 10, two or more separation portions 40 are preferably disposed between coupling portions 30 adjacent to each other in the short direction (first direction D1) of optical fiber tape core wire 10. Optical fiber tape core wire 10 of the present embodiment is disposed such that two separation portions 40 are located between coupling portions 30 adjacent to each other in the short direction (first direction D1) of optical fiber tape core wire 10. Since the number of coupling portions 30 can be reduced thereby, the width of optical fiber tape core wire 10 in its entirety can be shortened. Further, in the short direction of optical fiber tape core wire 10, separation portions 40 are preferably disposed such that separation portions 40 adjacent to each other overlap partially.

Length L1 of coupling portion 30 when optical fiber tape core wire 10 is viewed in a plan view as illustrated in FIG. 1A is not particularly limited. Length L1 is, for example, in a range of 5 mm or more and 15 mm or less. Further, thickness T of coupling portion 30 as illustrated in FIG. 1B is not particularly limited, either. Thickness T is, for example, in a range of 0.26 mm or more and 0.29 mm or less. When length L1 and thickness T of coupling portion 30 are within the above ranges, respectively, the strength of coupling portion 30 is increased, and even when optical fiber tape core wire 10 is wound, or twisted as necessary, such that its central axis is along the longitudinal direction, coupling portion 30 is less likely to tear. On the other hand, length L2 of separation portion 40 when optical fiber tape core wire 10 is viewed in a plan view as illustrated in FIG. 1A is not particularly limited. Length L2 is, for example, in a range of 45 mm or more and 55 mm or less. When length L2 of separation portion 40 is within the above range, it becomes easier to wind or twist optical fiber tape core wire 10 such that its central axis is along the longitudinal direction, when optical fiber tape core wire 10 is accommodated in a cable. In the present embodiment, length L1, thickness T, and length L2 are each average values when measured at any five locations within optical fiber tape core wire 10.

Configuration of Manufacturing Apparatus for Optical Fiber Tape Core Wire

Figures 3A, 3B:
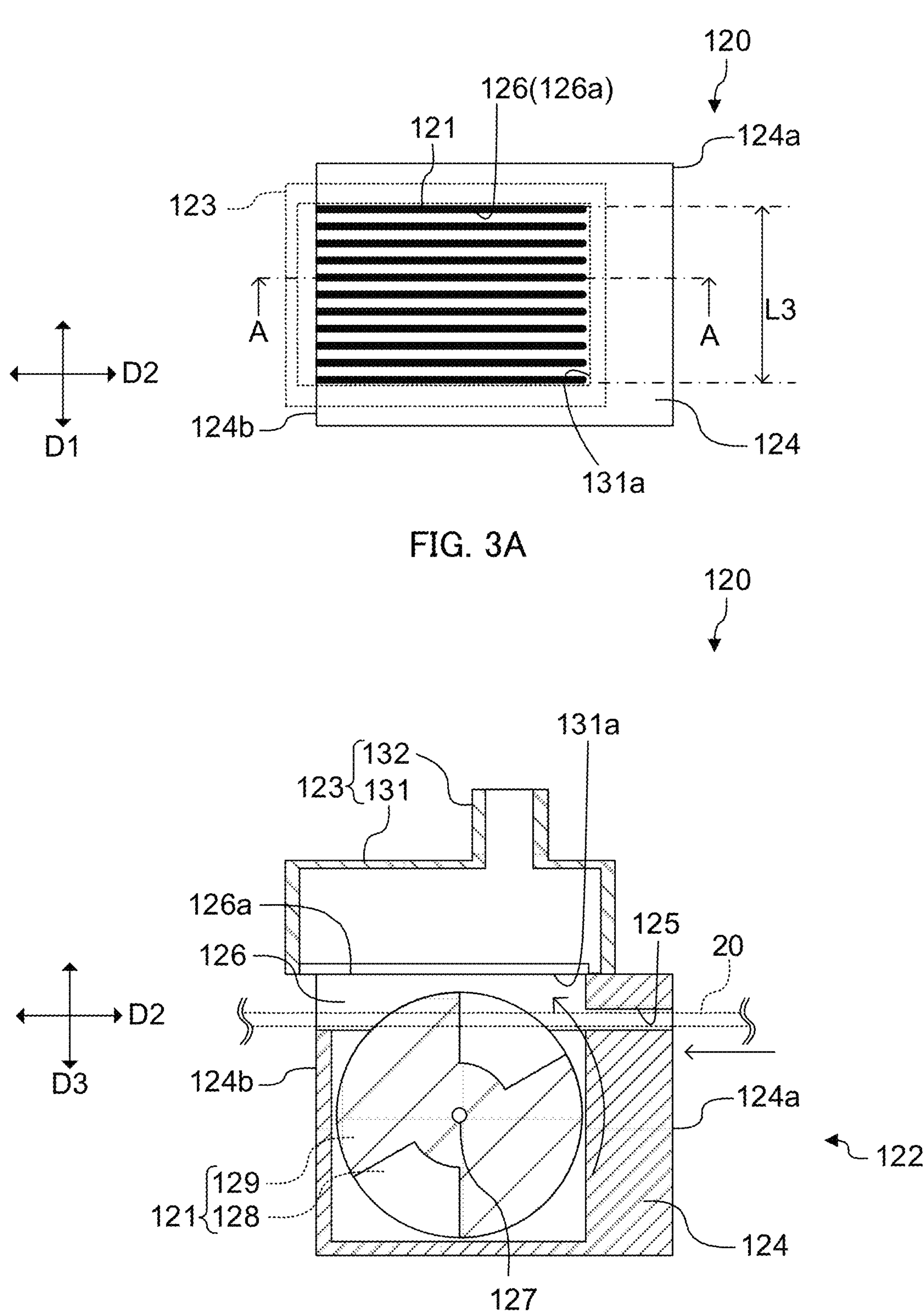
FIGS. 3A and 3B are schematic diagrams illustrating a configuration of a removal part.

Next, manufacturing apparatus 100 for an optical fiber tape core wire will be described. FIG. 2 is a perspective view of manufacturing apparatus 100 for optical fiber tape core wire 10. FIG. 3A is a plan view of positioning part 122, and FIG. 3B is a cross-sectional view of line A-A illustrated in FIG. 3A. FIG. 3B also illustrates a part of suction part 123 disposed on positioning part 122.

As illustrated in FIG. 2, manufacturing apparatus 100 for an optical fiber tape core wire includes coating part 110, removal part 120, and curing part 140. Manufacturing apparatus 100 for an optical fiber tape core wire is an apparatus for manufacturing optical fiber tape core wire 10 in which optical fibers 20 adjacent to each other are partially coupled to each other while sending out the plurality of optical fibers 20, which is disposed in parallel in first direction D1, in second direction D2, which is the length direction of the plurality of optical fibers 20.

Coating part 110 forms tape layer 41 as an uncured tape layer by coating the plurality of optical fibers 20 disposed in parallel with a photocurable resin in an uncured state (hereinafter, also simply referred to as "resin in an uncured state"). The configuration of coating part 110 is not particularly limited as long as the above-described function can be exhibited. In the present embodiment, coating part 110 includes a die (not illustrated). The die includes an insertion hole through which a plurality of optical fibers 20 disposed in parallel in first direction D1 passes, and the shape of the opening of the insertion hole is a shape of a cross section orthogonal to the length direction of tape layer 41. By coating the plurality of optical fibers 20 disposed in parallel with the resin in an uncured state by using the die while sending out the plurality of optical fibers 20, tape layer 41 can be collectively formed for the plurality of optical fibers 20 in a continuous manner.

As illustrated in FIGS. 3A and 3B, removal part 120 partially removes the resin in an uncured state between, among the plurality of optical fibers 20 coated with the resin in an uncured state, optical fibers 20 adjacent to each other, thereby forming separation portions 40, in which optical fibers 20 adjacent to each other are partially separated from each other, and coupling portions 30, in which optical fibers 20 adjacent to each other are partially coupled to each other. Removal part 120 includes: a plurality of rotary blades 121 which is disposed so as to be located between optical fibers 20 adjacent to each other and intermittently extrudes the resin in an uncured state between optical fibers 20 adjacent to each other; positioning part 122 that positions optical fibers 20 coated with the resin in an uncured state with respect to the plurality of rotary blades 121; and suction part 123 that suctions the resin in an uncured state extruded by the plurality of rotary blades 121.

Positioning part 122 includes: positioning part main body 124; through-hole 125 through which optical fibers 20 covered with the resin in an uncured state pass; a plurality of slits 126 each of which communicates with through-hole 125 and in which the plurality of rotary blades 121 rotates, respectively; and a plurality of outlet openings 126*a* of the plurality of slits 126, through which the resin extruded by the plurality of rotary blades 121 comes out. Through-hole 125, the plurality of slits 126, and the plurality of outlet openings 126*a* are provided in positioning part main body 124.

The plurality of rotary blades 121 partially extrudes the resin in an uncured state between optical fibers 20 adjacent to each other. The plurality of rotary blades 121 is disposed on the inner side of the plurality of slits 126, respectively. Rotary blade 121 is disposed such that an end part of slit 126 thereof on a side of outlet opening 126*a* of slit 126 is located on the side of outlet opening 126*a* of slit 126 with respect to an upper end portion of optical fiber 20 that is sent. The plurality of rotary blades 121 is configured such that the rotation thereof is controlled by motors (not illustrated in the figures), and that the plurality of rotary blades 121 rotates following the conveyance of optical fibers 20, and rotation axes 127 thereof coincide with each other. The shapes of the plurality of rotary blades 121 may all be the same or may each be different. In the present embodiment, each of the plurality of rotary blades 121 has the same shape.

Figure 4A:
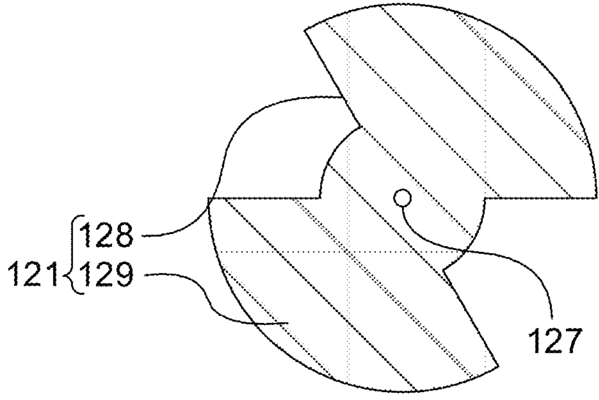
FIGS. 4A and 4B are schematic diagrams illustrating a configuration of a rotary blade.
Figure 4B:
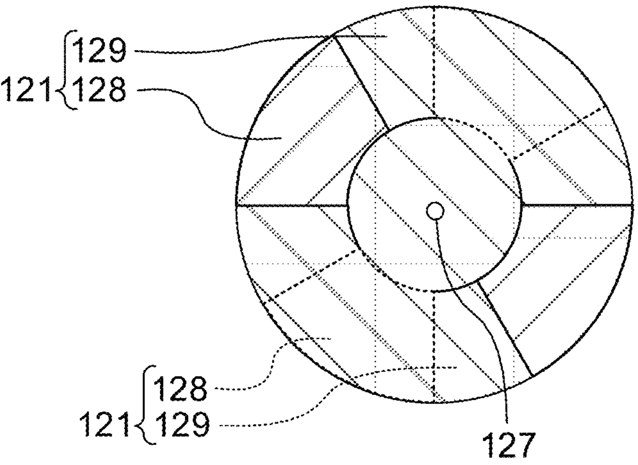

As illustrated in FIGS. 4A and 4B, in the present embodiment, rotary blade 121 includes notch portion 128 and blade portion 129. The number of rotary blades 121, in which the circumferential direction of notch portion 128 corresponds to the length of separation portion 40 and the circumferential direction of blade portion 129 corresponds to the length of coupling portion 30, is the same as the number of slits 126. As illustrated in FIG. 4B, the plurality of rotary blades 121 is disposed such that the positions of notch portions 128 of rotary blades 121 adjacent to each other are different from each other (FIG. 4B illustrates an example in the case of three rotary blades 121). When rotary blades 121 rotate following the conveyance of optical fibers 20, the plurality of rotary blades 121 rotate while the positions of notch portions 128 of the plurality of rotary blades 121 remain different from each other, and the plurality of rotary blades 121 rotate, and separation portions 40 and coupling portions 30 are alternately formed. The position of each notch portion 128 in the plurality of rotary blades 121 is appropriately set according to the positions of coupling portions 30 and the positions of separation portions 40 in optical fiber tape core wire 10. Specifically, when notch portion 128 is located between optical fibers 20 adjacent to each other, the photo-curable resin in an uncured state is not extruded, and thus, coupling portion 30 is formed. On the other hand, when blade portion 129 is located between optical fibers 20 adjacent to each other, the resin in an uncured state is extruded from between optical fibers 20 adjacent to each other, and thus, the resin in an uncured state is no longer present between optical fibers 20 adjacent to each other, and separation portion 40 is formed.

Note that, although not particularly illustrated, rotary blade 121 is preferably disposed such that a distance between rotary blade 121 and optical fiber 20 is in a range of 0 to 10 μm, and rotary blade 121 is more preferably disposed such that the distance is in a range of 0 to 5 μm. As described above, by shortening the distance between rotary blade 121 and optical fiber 20, tape layer 41 formed on the side surfaces of optical fibers 20 can be made thinner (see FIG. 1B).

As described above, positioning part 122 includes positioning part main body 124, through-hole 125, the plurality of slits 126, and the plurality of outlet openings 126*a*.

In the present embodiment, positioning part main body 124 is formed in a substantially rectangular parallelepiped shape. In positioning part main body 124, through-hole 125 through which the plurality of optical fibers 20 passes, the plurality of slits 126 in which the plurality of rotary blades 121 rotates, respectively, and the plurality of outlet openings 126*a* of the plurality of slits 126, through which the resin extruded by the plurality of rotary blades 121 comes out, are formed.

Through-hole 125 allows the plurality of optical fibers 20 coated with the resin in an uncured state to pass therethrough. In the present embodiment, through-hole 125 opens to back surface 124*a* (the side surface on the right side in FIG. 3B) and front surface 124*b* (the side surface on the left side in FIG. 3B) of positioning part main body 124. The cross-sectional shape of through-hole 125 in a direction along third direction D3 and first direction D1 is a shape complementary to the cross section of optical fiber 20 coated with the resin in an uncured state.

The plurality of slits 126 is configured such that the plurality of rotary blades 121 can rotate therein, respectively. The plurality of slits 126 is each disposed along second direction D2 and is disposed in parallel in first direction D1. Outlet opening 126*a* of slit 126 opens to a surface (in the present embodiment, the upper surface) of suction part 123 of positioning part main body 124. Further, a downstream-side end part of slit 126 opens to front surface 124*b* of positioning part main body 124. All of the plurality of slits 126 may have the same shape, or may have different shapes. In the present embodiment, all of the plurality of slits 126 have the same shape. The number of slits 126 is equal to or greater than the number of portions each of which is a portion between optical fibers 20 adjacent to each other. In the present embodiment, the number of slits 126 is eleven because the number of portions each of which is a portion between optical fibers 20 adjacent to each other is eleven.

Since rotary blade 121 is disposed in slit 126, the resin in an uncured state is extruded through outlet opening 126*a* of the slit. Further, as described above, since rotary blade 121 follows the conveyance of optical fibers 20, stress is generated, in the feeding direction of optical fibers 20, on the resin in an uncured state extruded from slit 126 by rotary blade 121. At this time, since the downstream-side end part of slit 126 opens to front surface 124*b* of positioning part main body 124, the resin in an uncured state does not get clogged, and it is possible to prevent the resin from coming into contact with optical fiber 20 again.

Suction part 123 suctions the resin in an uncured state extruded through outlet opening 126*a* of slit 126. Suction part 123 includes taking-in part 131, a negative pressure apparatus (not illustrated in the figures), and connection part 132 for connecting taking-in part 131 and the negative pressure apparatus.

Taking-in part 131 is formed in a hollow box shape and includes suction opening 131*a* disposed so as to cover the plurality of outlet openings 126*a* of the plurality of slits 126, through which the resin extruded by the plurality of rotary blades 121 comes out. A downstream-side end part of suction opening 131*a* is preferably disposed on a downstream side of downstream-side end parts of the plurality of outlet openings 126*a*. Thus, it is possible to appropriately suction even the resin in an uncured state accumulated on the downstream side of the plurality of outlet openings 126*a*, and to prevent the resin in an uncured state accumulated on the downstream side of the plurality of outlet openings 126*a* from coming into contact with optical fibers 20 again. Further, an upstream-side end part of suction opening 131*a* is disposed on an upstream side of upstream-side end parts of the plurality of outlet openings 126*a*. In the present embodiment, the upstream-side end part of suction opening 131*a* is disposed in the same position as the upstream-side end parts of the plurality of outlet openings 126*a*.

Further, the length of suction opening 131*a* in the arrangement direction (first direction D1) of the plurality of optical fibers 20 is preferably a length in a range of 100% to 120% with respect to the length of the plurality of outlet openings 126*a* in the arrangement direction of the plurality of optical fibers 20. Here, "length L3 of the plurality of outlet openings 126*a* in the arrangement direction of the plurality of optical fibers 20" means the length between an outer-side end portion of slit 126 disposed in one end portion in first direction D1 (in the example illustrated in FIG. 3A, the outer-side end portion of slit 126 at the lower end) and an outer-side end portion of slit 126 disposed in the other end portion in first direction D1 (in the example illustrated in FIG. 3A, the outer-side end portion of slit 126 at the upper end). Thus, the volume of the space surrounded by taking-in part 131 and the upper surface of positioning part main body 124 can be reduced and the space can be efficiently subjected to a negative pressure by the suction apparatus. Thus, the resin in an uncured state can be efficiently and appropriately suctioned.

Connection part 132 connects taking-in part 131 and the negative pressure apparatus (not illustrated in the figures). In the present embodiment, connection part 132 is connected to the surface of taking-in part 131 on the side opposite to suction opening 131*a*. By operating the negative pressure apparatus, the space surrounded by taking-in part 131 and the upper surface of positioning part main body 124 can be brought into a negative pressure state, and the resin in an uncured state remaining around the plurality of optical fibers 20 is not suctioned, but the resin in an uncured state extruded into the space is suctioned. The condition for suctioning the resin in an uncured state extruded into the space without suctioning the resin in an uncured state remaining around the plurality of optical fibers 20 is appropriately adjusted based on the volume of the space and the suction pressure by the negative pressure apparatus. Note that, the negative pressure apparatus is preferably operated constantly during the manufacturing of optical fiber tape core wire 10.

Curing part 140 cures the resin in an uncured state remaining on the plurality of optical fibers 20. The configuration of curing part 140 is not particularly limited as long as the above-described function can be exhibited. In the present embodiment, curing part 140 includes first light irradiation part 141 and second light irradiation part 142. First light irradiation part 141 is disposed on the upstream side, and irradiates tape layer 41 with light to semi-cure the uncured tape layer. Second light irradiation part 142 further irradiates tape layer 41 with light to completely cure the semi-cured tape layer. In the present embodiment, the integrated irradiation amounts of first light irradiation part 141 on the upstream side and second light irradiation part 142 on the downstream side are adjusted such that the integrated irradiation amount of first light irradiation part 141 is small and the integrated irradiation amount of second light irradiation part 142 is large.

Manufacturing Method for Optical Fiber Tape Core Wire

Figure 5:
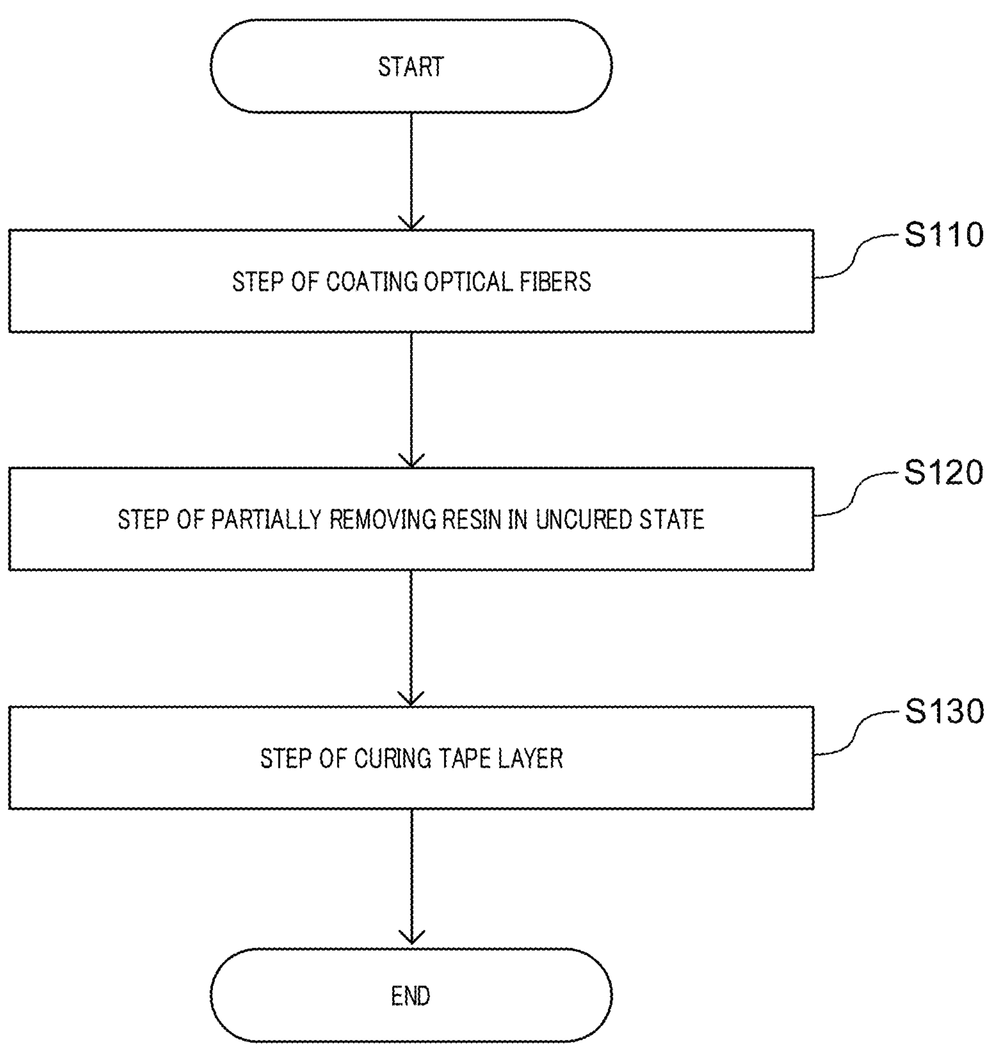
FIG. 5 is a flowchart of a manufacturing method for an optical fiber tape core wire.

Next, a manufacturing method for an optical fiber tape core wire will be described. FIG. 5 is a flowchart of a manufacturing method for an optical fiber tape core wire.

As illustrated in FIG. 5, the manufacturing method for an optical fiber tape core wire includes a step of coating a plurality of optical fibers (S110), a step of partially removing a resin in an uncured state (S120), and a step of curing a tape layer (S130).

In the step of coating optical fibers (S110), a plurality of optical fibers 20 disposed in parallel is coated with a resin in an uncured state. Optical fibers 20 may be a commercially available product or may be manufactured. For example, coating part 110 of the manufacturing apparatus illustrated in FIG. 2 is used to form tape layer 41 as an uncured tape layer. Specifically, tape layer 41 is formed by applying a resin in an uncured state in a tape shape on the plurality of optical fibers 20 with a die while sending out the plurality of optical fibers 20.

In the step of partially removing a resin in an uncured state (S120), for example, manufacturing apparatus 100 illustrated in FIG. 2 is used to form coupling portions 30 and separation portions 40. Specifically, coupling portions 30 and separation portions 40 are formed by rotating the plurality of rotary blades 121 with respect to tape layer 41 and partially removing tape layer 41. When rotary blades 121 rotate following the conveyance of optical fibers 20, separation portions 40 and coupling portions 30 are alternately formed. At this time, the resin in an uncured state that has been removed by rotary blades 121 is extruded toward outlet openings 126*a* of slits 126. The resin in an uncured state, which has been extruded through outlet openings 126*a* of slits 126, is suctioned by suction part 123.

In the step of curing tape layer 41 (S130), tape layer 41 is irradiated with light by first light irradiation part 141 to semi-cure tape layer 41 as an uncured tape layer, and finally tape layer 41 is further irradiated with light by second light irradiation part 142 to completely cure tape layer 41 as a semi-cured tape layer.

Effect

As described above, according to the present invention, the resin in an uncured state between optical fibers 20 adjacent to each other is extruded from slits 126 by rotary blades 121 and the extruded resin is suctioned, and thus, it is possible to obtain optical fiber tape core wire 10 in which coupling portions 30 and separation portions 40 are appropriately formed.

INDUSTRIAL APPLICABILITY

The optical fiber tape core wire according to the present invention is useful for, for example, an optical fiber or the like used in high-speed and high-capacity optical fiber communication networks.

REFERENCE SIGNS LIST

10 Optical fiber tape core wire
20 Optical fiber (single-core coated optical fiber)
21 Optical fiber strand
22 Primary coating layer
23 Secondary coating layer
30 Coupling portion
40 Separation portion
41 Tape layer
100 Manufacturing apparatus
110 Coating part
120 Removal part
121 Rotary blade

122 Positioning part
123 Suction part
124 Positioning part main body
124*a* Back surface
124*b* Front surface
125 Through-hole
126 Slit
126*a* Outlet opening
127 Rotation axis
128 Notch portion
129 Blade portion
131 Suction part main body
131*a* Suction opening
132 Connection part
140 Curing part
141 First light irradiation part
142 Second light irradiation part

The invention claimed is:

1. A manufacturing method for an optical fiber tape core wire, wherein the optical fiber tape core wire including a plurality of single-core coated optical fibers is manufactured while moving the plurality of single-core coated optical fibers from upstream to downstream, the plurality of single-core coated optical fibers being partially coupled to each other, the method comprising:

coating the plurality of single-core coated optical fibers with a resin in an uncured state, the plurality of single-core coated optical fibers being disposed in parallel;

partially removing, by a removal part, the resin in the uncured state between, among the plurality of single-core coated optical fibers coated with the resin in the uncured state, a pair of the plurality of single-core coated optical fibers, the pair of the plurality of single-core coated optical fibers being adjacent to each other; and curing the resin in the uncured state remaining on the plurality of single-core coated optical fibers, wherein:

the removal part includes:

a plurality of rotary blades each of which is disposed so as to be located between the pair of the plurality of single-core coated optical fibers adjacent to each other and intermittently extrudes the resin in the uncured state between the pair of the plurality of single-core coated optical fibers adjacent to each other;

a positioning part including:

a through-hole through which the plurality of single-core coated optical fibers coated with the resin in the uncured state passes;

a plurality of slits each communicating with the through-hole, the plurality of slits being a plurality of slits inside which the plurality of rotary blades rotates, respectively;

a plurality of outlet openings of the plurality of slits, the plurality of outlet openings being a plurality of outlet openings through which the resin extruded by the plurality of rotary blades comes out; and a positioning part main body in which the through-hole, the plurality of slits, and the plurality of outlet openings are formed; and a suction part including a suction opening, the suction opening being disposed so as to cover the plurality of outlet openings, the positioning part includes, along a moving direction of the plurality of single-core coated optical fibers, an upstream-side portion and a downstream-side portion, the through-hole is disposed in the upstream-side portion, the plurality of rotary blades, the plurality of slits, and the plurality of outlet openings are disposed in the downstream-side portion, downstream-side end portions of the plurality of slits open to a front surface of the positioning part main body, the front surface being a downstream-side surface of the positioning part main body, the plurality of outlet openings opens to a downstream-side end portion of the positioning part, the downstream-side end portion of the positioning part being an end portion of the positioning part on a downstream side of a moving direction of the plurality of single-core coated optical fibers, a downstream-side end portion of the suction opening is disposed on a downstream side of downstream-side end portions of the plurality of outlet openings and the downstream-side end portion of the positioning part, the suction opening is disposed in a position opposing the plurality of outlet openings, and in the partially removing of the resin in the uncured state, the resin in the uncured state between the pair of the plurality of single-core coated optical fibers adjacent to each other is intermittently extruded to the plurality of outlet openings by rotating while moving the plurality of single-core coated optical fibers coated with the resin in the uncured state from upstream to downstream in the through-hole, and the resin in the uncured state extruded through the plurality of outlet openings is suctioned by the suction part.

2. The manufacturing method for the optical fiber tape core wire according to claim 1, wherein a length of the suction opening in an arrangement direction of the plurality of single-core coated optical fibers is a length within a range of 100% to 120% with respect to a length of the plurality of outlet openings in the arrangement direction of the plurality of single-core coated optical fibers.

* * * * *